United States Patent [19]

Dinges

[11] Patent Number: 4,529,872
[45] Date of Patent: Jul. 16, 1985

[54] MAGNETIC CARD READER

[75] Inventor: Wolfgang Dinges, Pulheim, Fed. Rep. of Germany

[73] Assignee: Dicom Electronics GmbH, Fed. Rep. of Germany

[21] Appl. No.: 453,520

[22] Filed: Dec. 27, 1982

[30] Foreign Application Priority Data

Jan. 5, 1982 [DE] Fed. Rep. of Germany ....... 3200106
Jun. 7, 1982 [DE] Fed. Rep. of Germany ....... 3221445

[51] Int. Cl.$^3$ ............................................. G06K 13/00
[52] U.S. Cl. ...................................... 235/482; 235/483
[58] Field of Search ..................... 235/482, 483; 360/2

[56] References Cited

U.S. PATENT DOCUMENTS 3,976,858  8/1976  Haun ..................................... 235/482
4,047,229  9/1977  Kobylarz ............................... 360/2
4,197,988  4/1980  Moss ..................................... 360/2

FOREIGN PATENT DOCUMENTS 2356695  11/1973  Fed. Rep. of Germany .
2705534   2/1977   Fed. Rep. of Germany .
2356206   6/1977   France .

Primary Examiner—Harold I. Pitts
Attorney, Agent, or Firm—Jones & Askew

[57] ABSTRACT

A magnetic card reader for reading signals recorded on the magnetic track of a card. The magnetic reading head is mounted on a supporting body contained within a housing, and the card is inserted through a slot in the housing to engage a stop on the supporting body. The stop and the supporting body is moved against the force of a spiral spring until the supporting body reaches an end-position within the housing, whereat the stop engages a counterstop to lower the stop beneath the magnetic card. The supporting body thereby is released for return movement in response to the force of the spring, and the magnetic track on the card is read during this return movement. The spring in one embodiment is a spring band spiral spring wound on a support roller rotatably carried by the reading head supporting body, providing a uniform return velocity of the supporting body for a uniform scanning rate of the magnetic card.

7 Claims, 14 Drawing Figures

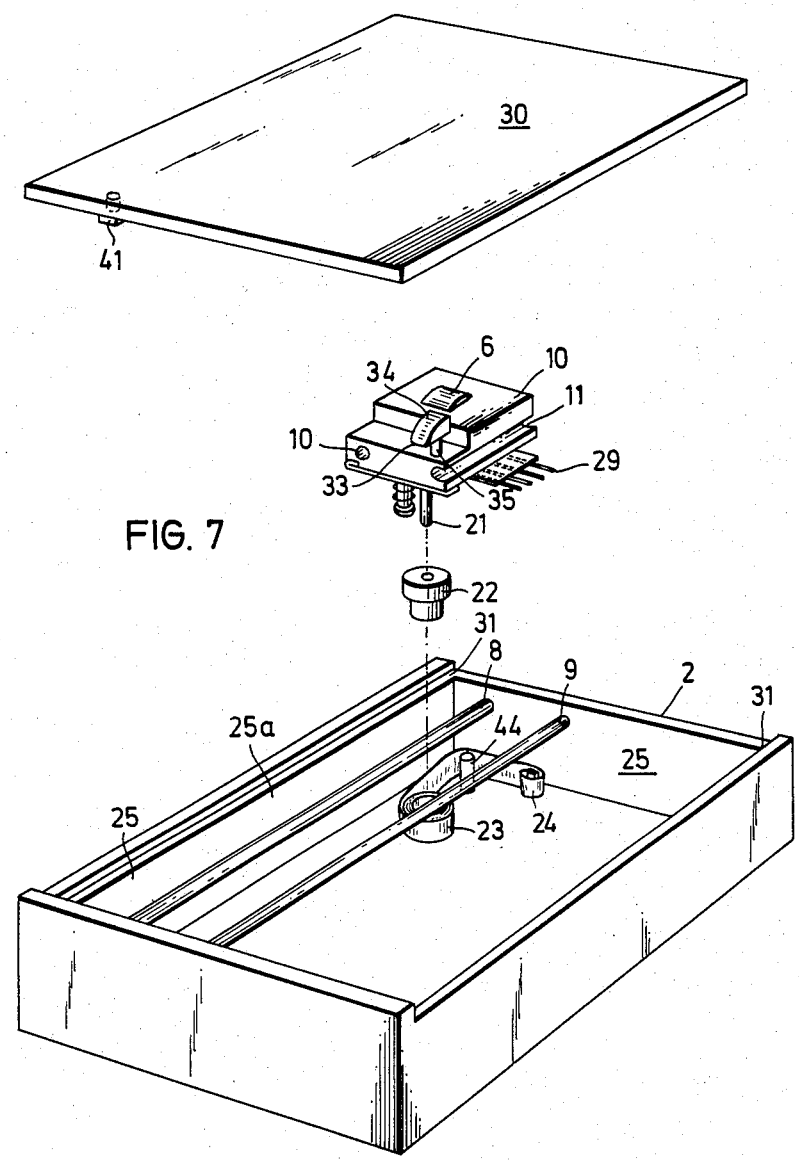

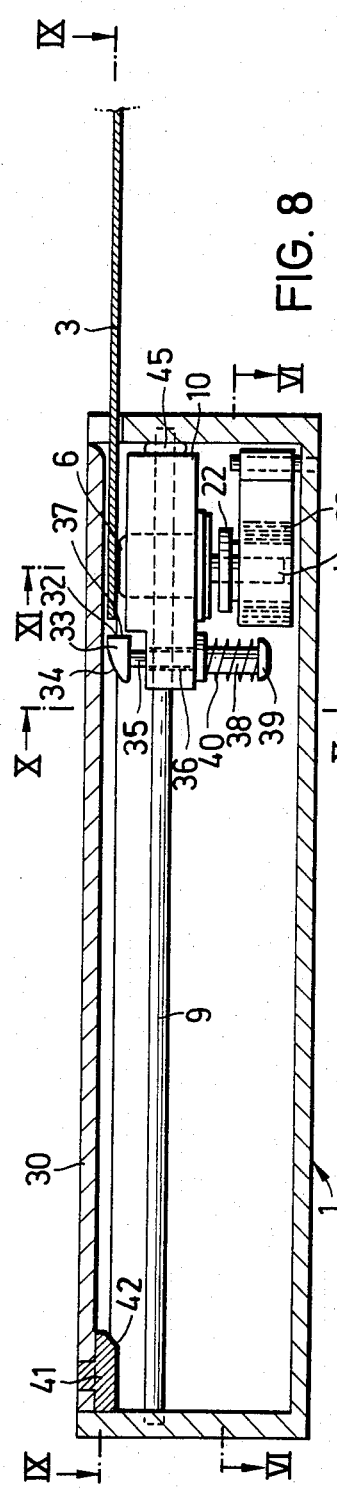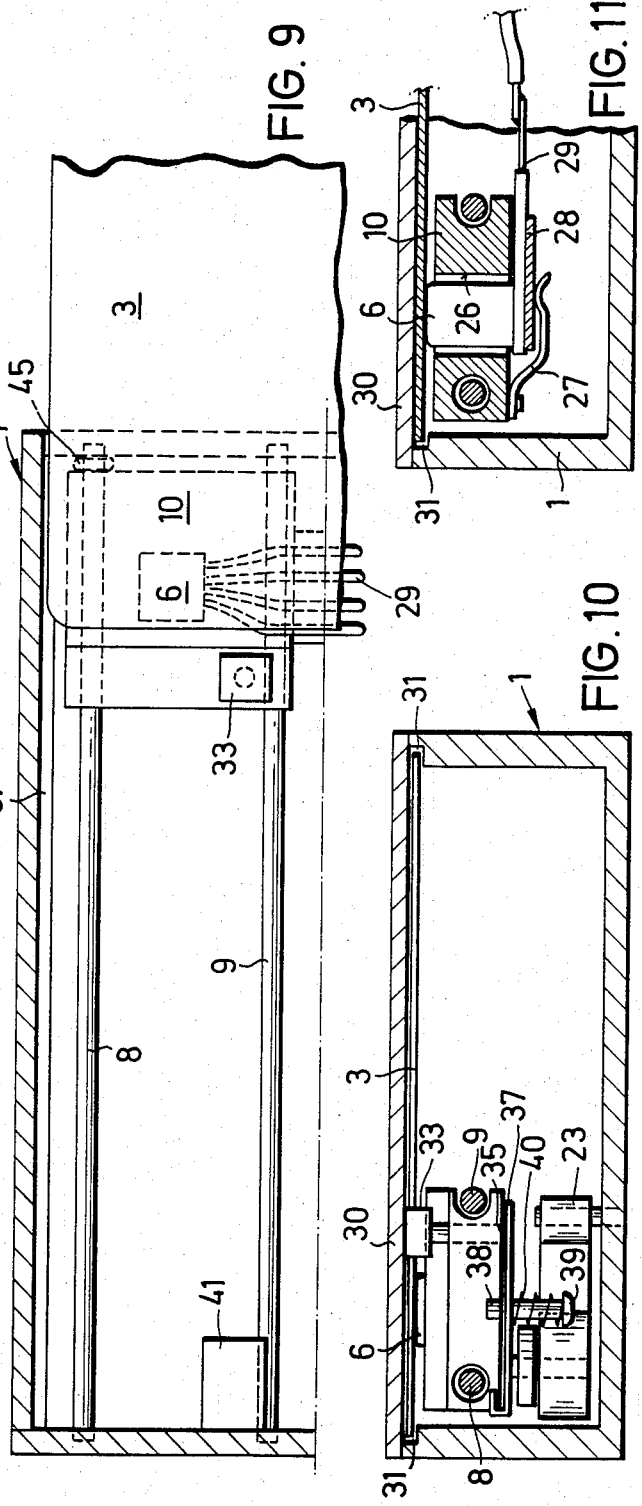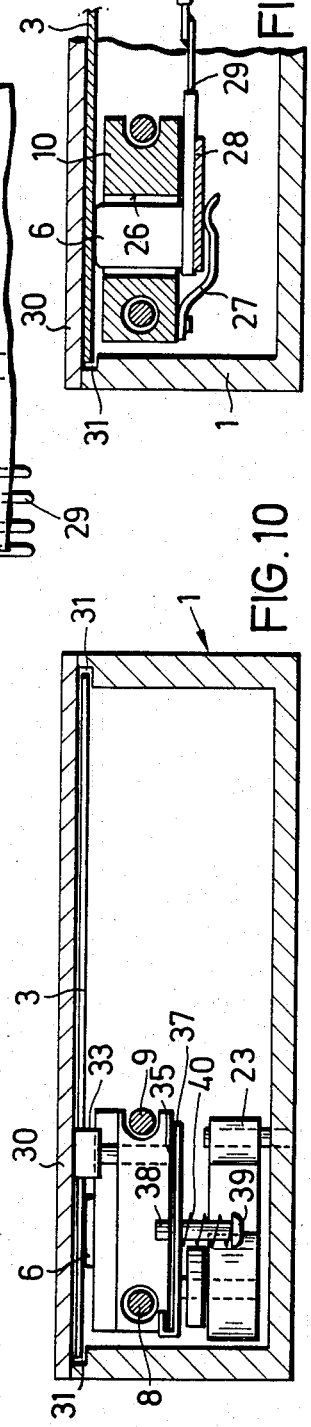

MAGNETIC CARD READER

BACKGROUND OF THE INVENTION

The present invention concerns a magnetic card reader which consists of a housing with an insertion slot and a magnetic card guide to hold a magnetic card, as well as a reading head positioned above the magnetic card guide, so that the magnetic track of the magnetic card can be read.

The requirements regarding accurate reading of magnetic cards have been increasing steadily, since the quantity of information stored on the magnetic tracks on magnetic cards has been increasing, but this makes accurate guidance of the magnetic card an absolute necessity. However, it is extremely difficult to accurately guide a moving magnetic card past a stationary reading head, because the magnetic cards are often bent or rolled and are also subject to variations in dimensions. In addition, accurate data acquisition by means of the reading head requires a uniform reading rate, which is difficult, if not impossible, to achieve when the cards are inserted by hand.

SUMMARY OF THE INVENTION

This invention is based on the goal of creating a magnetic card reader which is simple and extremely compact on the one hand while also permitting a highly accurate and always reproducible reading accuracy.

This is achieved according to this invention by mounting the reading head so that it can move in the longitudinal direction of the card and by providing a connection to a drive system. This invention is thus based on the fundamental concept that it is preferable to move the reading head over a stationary magnetic card than to move a magnetic card past a stationary reading head. The rate of movement of the reading head can then be adjusted accurately, and the card guidance system can be simplified significantly, because the card need only be secured in a stationary position. Furthermore, insertion of the magnetic card then requires much less concentration, because the rate of insertion is no longer important.

It may also be advantageous for the reading head to be mounted in a spring mount perpendicular to the axis of guidance of the magnetic card guide. This makes it easy to compensate for irregularities in the magnetic card.

This is especially advantageous when the reading head rests on the magnetic card, which makes it possible to produce especially high read output signals.

BRIEF DESCRIPTION OF DRAWING

FIG. 7 shows an exploded perspective view of another embodiment of a reader according to the present invention.

FIG. 8 shows a longitudinal section through a reader according to FIG. 7, in a ready-for-use condition.

FIG. 9 shows a section along line IX—IX in FIG. 8.

FIG. 10 shows a section along line X—X in FIG. 8.

FIG. 11 shows a section along line XI—XI in FIG. 8.

Figure 1:
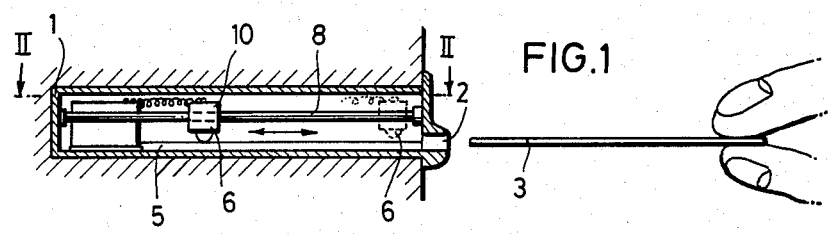
FIG. 1 shows a longitudinal section through a reader according to this invention.
Figure 3:
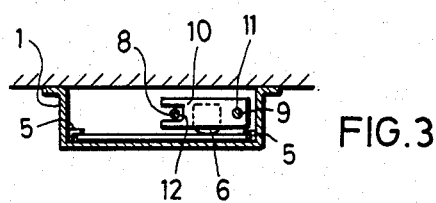
FIG. 3 shows a section along line III—III in FIG. 2.

As FIG. 1 shows, a magnetic card reader according to this invention consists of a housing 1 with a slot opening 2 for a magnetic card 3 on the front side of the reader. Inside housing 1, insertion slot 2 leads to guide 4 for magnetic card 3. This guide 4 may consist of guide rails 5 which have a U-shaped cross section and are attached to the two longitudinal walls of housing 1. Guide rails 5 are on opposite sides from each other and form a guide plane. The length of guide rails 5 corresponds to the insertion length of magnetic card 3, and their distance from each other corresponds to the width of magnetic card 3, so that the magnetic card sits securely in guide 4. A reading head 6 is located above guide 5 in housing 1. This arrangement is such that the reading head is above the center of the magnetic strip 7 of magnetic card 3 when the magnetic card is inserted into the reader. Reading head 6 is mounted so that it can move in the direction of the longitudinal axis of the magnetic card and the magnetic strip 7. Two parallel guide bars 8 and 9 mounted in housing 1 serve this purpose. The reading head 6 is guided on the guide bars by means of a supporting body 10 which has two guides 11 and 12, one of which (11) is designed as a through-hole and the other (12) is an open groove, as shown in FIG. 3. Guide bar 9 is designed as a spindle and guide 11 as a threaded hole with an internal thread that matches the spindle thread. It is also advantageous for reading head 6 to be mounted in a spring mount perpendicular to the guide plane. This is achieved in the present example by having the guide bars 8 and 9 themselves be resilient or spring-mounted. This makes it possible for the reading head to rest on magnetic track 7 when magnetic card 3 is inserted. Such contact is advantageous in the reading process because this makes it possible to produce the maximum read output signal. Thanks to the spring suspension provided for the reading head, it can compensate for irregularities in the magnetic card as it moves over the reading track in the reading operation.

Figure 2:
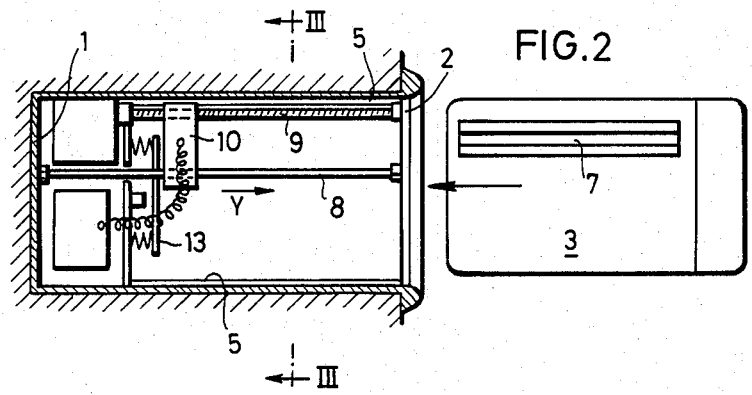
FIG. 2 shows a view of the reader according to FIG. 1, along line II—II in FIG. 1.

The drive for the reading head should preferably include a spring tension system, which has a tension lever (not shown) that runs parallel with a guide rail 5 on one side and is linked mechanically with the supporting body 10 of reading head 6. When the spring tension system is in the released position, the tension lever with the reading head 6 is positioned directly behind insertion slot 2, as indicated with dotted lines in FIG. 1. When magnetic card 3 is inserted, the tension lever and thus also reading head 6 are moved toward the rear in housing 1, producing tension in the spring tension system. After complete insertion of the magnetic card 3 as far as stop 13 (see FIG. 2), this final position is reached. Stop 13 serves to trigger the scanning movement of the reading head 6 in the direction of arrow Y. Stop 13 can function mechanically to trigger the tension system or it may operate an electric release contact. The drive for reading head 6 includes the tension device, a toothed gear wheel on guide bar 9, which is in the form of a spindle, so that the latter rotates and thus drives the supporting body 10 which is guided with its threaded hole 11 on guide bar 9. To achieve a uniform scanning movement of reading head 6, a velocity-dependent braking mechanism is preferably connected to the reading head drive. This braking mechanism works in such a way that the braking effect is greater at the beginning of the movement than at the end of the movement, because the release of tension device at the beginning causes a greater acceleration of the reading head than at the end of the release of the tension device. After reading the magnetic strip 7, the magnetic card is removed from the reader, so that the reading head is then positioned directly behind insertion slot 2 again.

Figure 4:
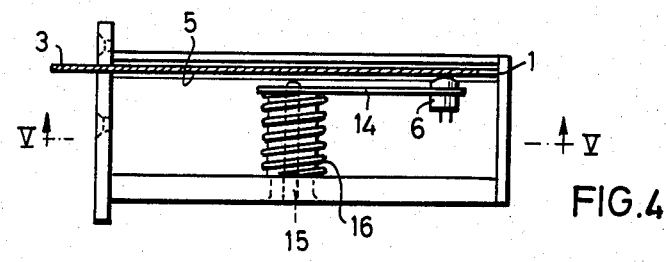
FIG. 4 shows a longitudinal section through another version of a reader according to this invention.
Figure 5:
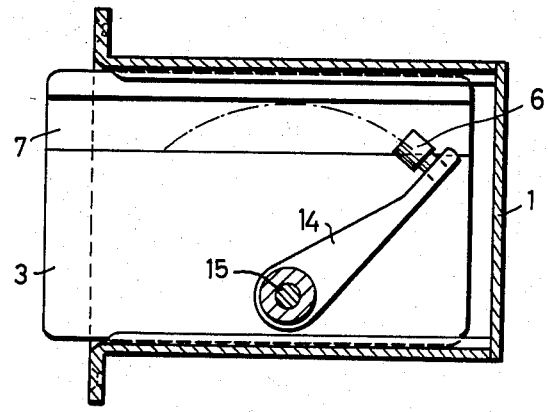
FIG. 5 shows a view of the reader according to FIG. 4 along line V—V in FIG. 4.

FIGS. 4 and 5 show another version of the reader according to this invention. This version differs from the version depicted in FIGS. 1 to 3 in the way the reading head 6 is mounted, and thus the concrete design of the drive mechanism also varies. Furthermore, it also differs from the version depicted in FIGS. 1 to 3 in that the magnetic card here is scanned by the reading head 6 from beneath, whereas it is scanned from above in the version described previously. However, the way the magnetic card is guided here is essentially the same as the guide system illustrated in FIGS. 1 to 3. In the version shown here, reading head 6 is mounted on one end of arm 14. The other end of this arm on the opposite end from the reading head 6 is mounted so that it can pivot on axle 15 which is perpendicular to the guide plane of guide 4 of magnetic card 3. A spring tension device 16 serves as the drive for the scanning movement of reading head 6 and is concentric about axle 15. Due to the fact that reading head 6 is mounted at only one end, it executes a circular scanning movement, which yields a larger scanning path in comparison with a linear movement of the reading head, thereby further improving the accuracy. The beginning and end of the swinging movement of arm 14 are preferably defined by stops which are adjustable. The tension in the spring tension device 16 is established through a tension lever (not shown in detail) which is mechanically linked to arm 14 and is positioned behind insertion slot 2 when the spring tension device is in the released position, so that the tension lever is moved when magnetic card 3 is inserted, and thus arm 14 is also moved, applying tension to the tension device. A braking device is again provided around axle 15 to effect a uniform scanning movement of reading head 6. Such a braking device may consist of an eddy current brake, for example. The scanning movement of the reading head may be activated by a mechanical or electrical contact which is operated by the low stop.

Figure 6:
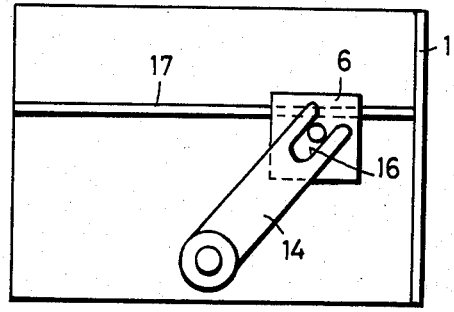
FIG. 6 shows another version of a reader according to this invention in longitudinal section.

FIG. 6 shows another version of the reader according to FIGS. 4 and 5, where reading head 6 travels in a longitudinal slot 16 of arm 14 and at the same time also travels in a guide rod 17 which is parallel with the magnetic card 3 in the longitudinal direction of the magnetic card in housing 1. As a result of this forced guidance of reading head 6, the reading head does not execute a circular movement here, but instead travels in a linear path.

FIGS. 7 to 11 show another version of the reader according to this invention, where the same parts as in FIGS. 1 to 6 have the same reference numbers. Inside housing 1, reading head 6 is guided with supporting body 10 by means of the two guide rods 8 and 9. Supporting body 10 therefore has as a guide the through-hole 11 and open groove 12 through which guide rods 8 and 9 pass. On the lower side of supporting body 10 there is a journal pin 21 on which a support roller 22 is mounted so that it can rotate. A spring band spiral spring 23 is wound on this support roller with the inside end attached to support roller 22. The outer end 24 of spiral spring 23 is attached to housing 1 below insertion slot 2 for magnetic card 3. The spring band of spiral spring 23 is in vertical alignment so that it is parallel with the side walls 25 of housing 1. The reading head 6 projects out of the top side of supporting body 10 where it is also mounted in a resilient spring mount and guided (see FIG. 11). A through-hole 26 in supporting body 10 matches the shape of reading head 6 and provides guidance. The spring mount is achieved with a plate spring 27 which is attached to the bottom side of supporting body 10, and its free bent end acts on the reading head via pressure plate 28 which is in contact with contact lug 29 of reading head 6. Due to this mounting of reading head 6, it is in spring contact with the magnetic track of magnetic card 3. Housing 1 is closed at the top with a cover 30, which also forms the upper boundary for guide grooves 31 which guide the longitudinal edges of magnetic card 3 in the lengthwise walls 25a of the housing. The size of the grooves is matched to the thickness of magnetic card 3, so that the card is guided in the grooves with only a slight tolerance.

Supporting body 10 also has a stop (see FIGS. 7 and 8). This stop consists of an upper stop part 33 and a guide pin 35 which is connected to the former and passes through a hole 36 in supporting body 10. Stop part 33 has a stop face 32 for magnetic card 3 which runs perpendicular to the direction of movement of the supporting body and parallel to the lateral edge of the inserted magnetic card 3. Guide pin 35 can slide in hole 36 and has a spring mount in the axial direction. In the version shown here, an elastic tongue 37 attached at one end to the bottom side of supporting body 10 is in contact with the end of guide pin 35 which projects downward out of supporting body 10. A bearing pin 38 passes through an opening in tongue 37 and is attached at one end in supporting body 10 while the opposite end has a head 39. Between head 39 and tongue 37, a compression spring 40 is positioned coaxially around bearing pin 38. Tongue 37 and thus also guide pin 35 can move against the spring force of compression spring 40.

Stop part 33 at the upper end of guide pin 35 has an inclined head face 34 which rises up to contact surface 32. The stop works together with a counterstop 41 in housing 1 on the side of the housing opposite the insertion slot 2. This counterstop 41 is mounted in the cover 30 in the version shown here. The edge 42 of counterstop 41 which faces supporting body 10 is inclined in the same direction as the head face 34 of the stop part 33 and works together with the latter in such a way that when stop part 33 is pressed against counterstop 41, guide pin 35 moves downward against the force of spring 40.

Figure 12:
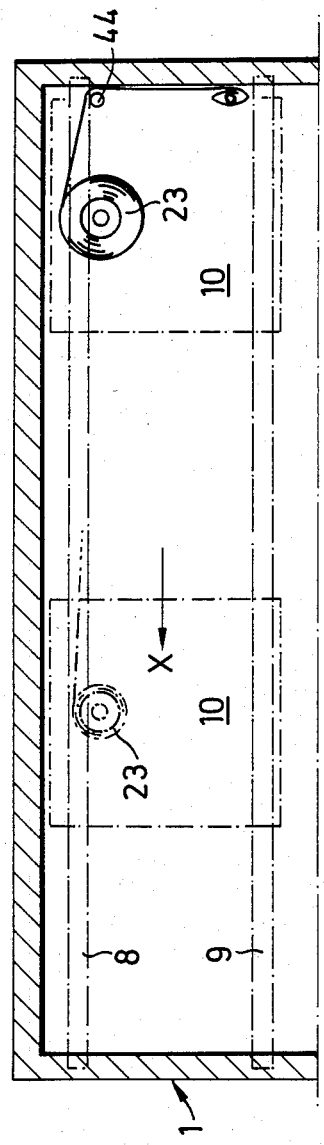
FIGS. 12, 13, and 14 show schematic diagrams of the reader according to FIG. 7 to illustrate the functioning of same.
Figure 13:
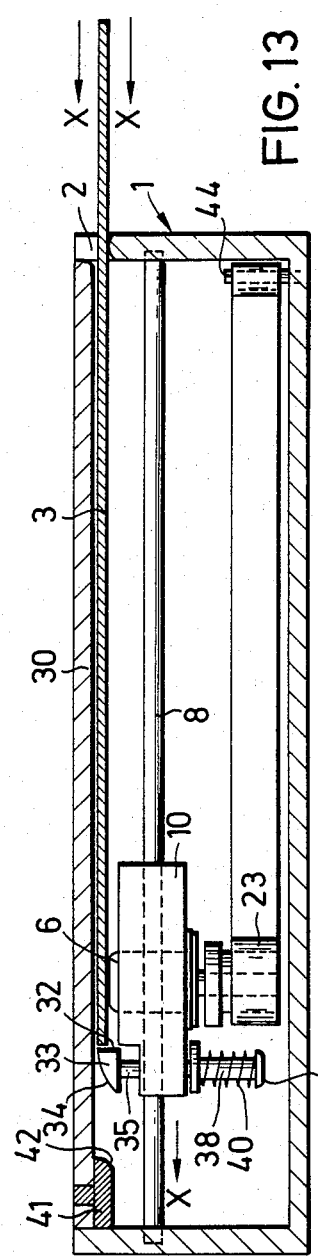
Figure 14:
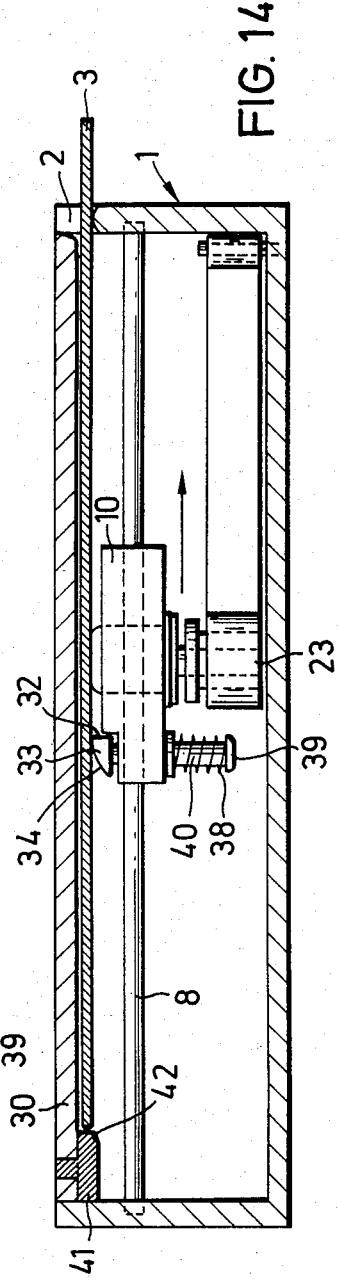

Operation of the reader according to this invention is illustrated in FIGS. 12 to 14, as described below. Magnetic card 3 is inserted through insertion slot 2, so that its front edge comes to rest against stop face 32 of stop 33. In this way, the entire supporting body 10 with reading head 6 is moved by the magnetic card 3 as the latter is inserted further (see direction of arrow X in FIG. 13). This causes spring band spiral spring 23 to unwind from the support roller 22. In order for the wound spring band to be essentially parallel with guide rods 8 and 9, it is guided about a deflection pin 44 which is mounted approximately opposite the axis of rotation of bearing roller 22 beneath insertion slot 2 in the bottom of housing 1. Magnetic card 3 is inserted until its front edge is in contact with counterstop 41 (see FIG. 14). Before reaching this stop, stop part 33 is first pressed downward by counterstop 41—namely, by the interaction of head face 34 and inclined edge 42 of counterstop 41. This releases supporting body 10, so that the reading head is set in motion when magnetic card 3 comes in contact with counterstop 41 and can read the magnetic card 3, which is now stationary. The return movement of supporting body 10 with reading head 6 is effected by the recoil force of stretched spiral spring 23. The spiral spring according to this invention is dimensioned so that a uniform scanning rate is achieved over the entire scanning path. Magnetic card 3 is held in the guides in such a way that it is not moved by the frictional forces generated by the reading head. This is assured by the tight fit of the magnetic card in the guides in the housing. However, either as an alternative or in addition, a plate spring may also be provided in the vicinity of counterstop 41 on the housing cover to secure the magnetic card in the inserted position.

After supporting body 10 has been returned to its starting position by coming to rest at a bumper 45, the scanning and reading operation is concluded and the magnetic card can be removed. Then the stop part 33 is returned to its starting position by the action of spring 40, so that its stop face 32 again comes to rest above the scanning plane of reading head 6.

The version of the reader according to this invention which is depicted in FIGS. 7 to 14 is not limited to the individual structural features described here, but instead, the scope of this invention includes all features which have the same effect in the sense of this invention.

An example of one possible use for the magnetic card reader according to this invention is in conjunction with automobile telephones, because the reader according to this invention has a highly compact form.

In addition, due to the fact that the stationary magnetic card is read by the moving reading head, this also yields the advantage that the magnetic card can easily be inserted while traveling, for example, because no special care is required in inserting the card, since it is not read until after it is completely inserted.

I claim:

1. In a card reader of the type comprising a housing with an insertion slot for a signal card containing recorded magnetic signals, a card guide positioned to receive a signal card through the insertion slot, and a scanning head within the housing positioned at one side of the guide so that the signal track of the signal card can be scanned, where the scanning head is movably positioned in the longitudinal direction of the card in such a way that on insertion of the signal card the scanning head is moved against the force of a spring in the direction of insertion and is freed in an end-position of the signal card, and due to the spring restoring force the resting signal card is scanned by the scanning head moving in opposite direction to the insertion, the improvement comprising:

the scanning head comprises a magnetic card reading head; and
   the spring comprises a spring band spiral spring coiled on a support roller which is movable with said scanning head; and
   said spiral spring is connected at one end to the magnetic card reading head and at the other end is connected to the housing,
   thereby imparting a substantially uniform restoring force to the scanning head and giving the magnetic card reading head a uniform scanning velocity over the entire scanning travel along the signal card in response to the restoring force of the spiral spring.

2. The card reader as in claim 1, wherein:
   said spiral spring comprises a flat spiral spring:
   said one end of the spiral spring being connected to said support roller on which the spiral spring is wound;
   said support roller being rotatably mounted on said scanning head; and
   said spiral spring being operative to exert a substantially uniform restoring force to the scanning head during the scanning movement of the scanning head,
   thereby achieving a substantially uniform scanning rate of the signals on the card.

3. The card reader as in claim 1, wherein the magnetic card reading head is spring mounted so as to provide a spring action perpendicular to the direction of movement of the scanning head, so that the card reading head is urged into reading relation with a card inserted in the slot.

4. The card reader as in claim 1, wherein:
   the scanning head is attached to a supporting body which is guided on two parallel guide rods which extend at least the longitudinal length of the card;
   said supporting body having a pair of guide apertures for the guide rods; and
   one of said guide apertures being a through-hole receiving one of the guide rods, and the other being an open groove receiving the other of the guide rods.

5. The card reader as in claim 4, wherein:
   the spring band spiral spring is on the support roller on the side of the supporting body opposite said card guide; and
   said other end of the spiral spring is attached to one wall of the housing in spaced apart relation to the insertion slot for the magnetic card.

6. The card reader as in claim 4, wherein:
   a stop positioned for engagement by the magnetic card is movably mounted on said supporting body, so that a card inserted in the slot will engage said stop and thereby move the supporting body and scanning head against the force of the spiral spring and so that the stop can move on a path perpendicular to the direction of movement of the supporting body; and further comprising
   a spring operatively associated with said stop to urge the stop into a card engaging position along said path.

7. The card reader as in claim 6, further comprising:
   counterstop means associated with the housing to be contacted by said stop when said supporting body is moved to said end position;
   said stop having an inclined head face positioned to confront the counterstop; and
   a complementary inclined face on the counterstop inclined in the same direction as said head face,
   whereby a magnetic card inserted into the slot engages said stop so that the insertion of the card moves said supporting body against the force of said spiral spring, and said stop is engaged by said inclined face of the counterstop at said end-position to move the stop on said perpendicular path and lower the stop body beneath the magnetic card, thereby releasing the supporting body for return movement in response to the force of the spiral spring.

* * * * *